April 27, 1948.  G. R. GREENSLADE  2,440,335
ELECTRIC CONTACT DEVICE
Filed Sept. 29, 1944   2 Sheets-Sheet 1
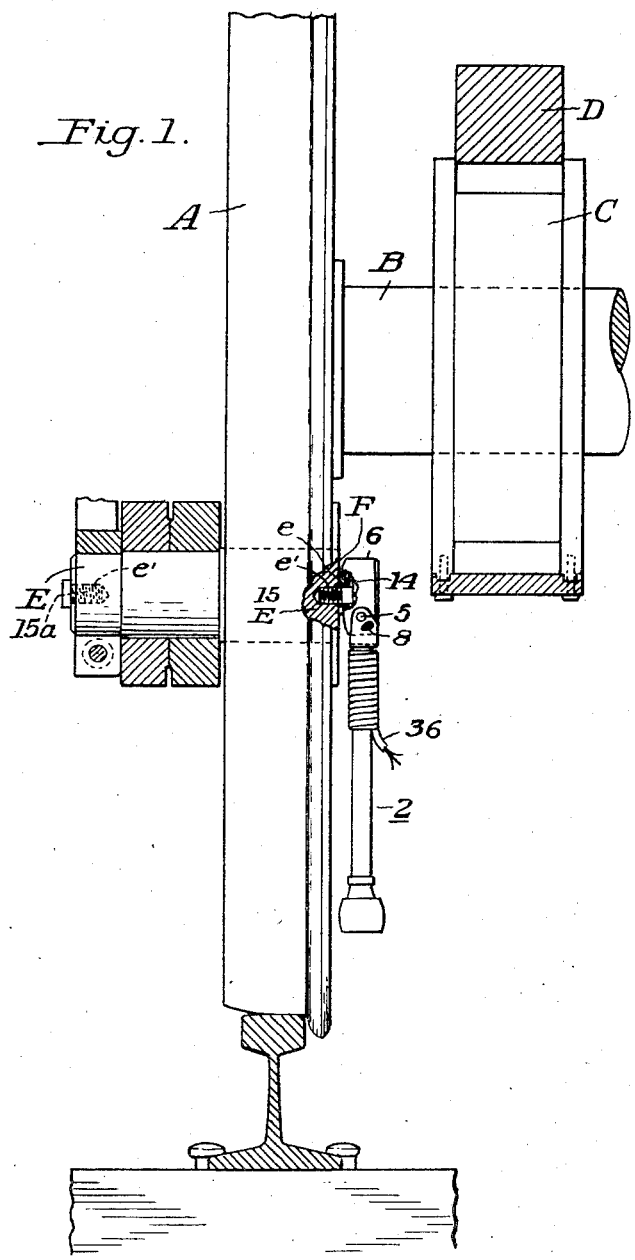
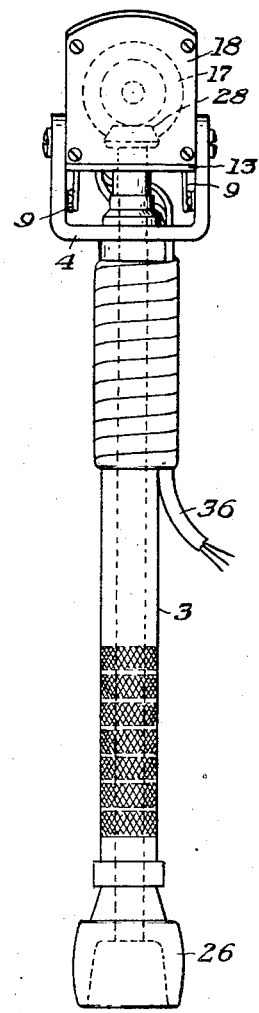
INVENTOR
Grover R. Greenslade April 27, 1948.  G. R. GREENSLADE  2,440,335
ELECTRIC CONTACT DEVICE
Filed Sept. 29, 1944  2 Sheets-Sheet 2

INVENTOR
Grover R. Greenslade
by his attorneys
Christy, Parmelee Stickland

Patented Apr. 27, 1948

2,440,335

UNITED STATES PATENT OFFICE 2,440,335

ELECTRIC CONTACT DEVICE

Grover R. Greenslade, Scott Township, Allegheny County, Pa., assignor to Flannery Bolt Company, Bridgeville, Pa., a corporation of Delaware Application September 29, 1944, Serial No. 556,371

12 Claims. (Cl. 173—324)

This invention pertains to electric contact devices and more particularly to a contact device for temporarily making a connection to a mechanical part while it is being tested.

In my Patent No. 2,326,352, granted August 10, 1943, there is disclosed a method for testing parts of machinery without removing them from the mechanism of which they form a part, the test comprising the measurement of the electrical resistance of the part as compared with a like measurement made at a preceding time. The method is based on the theory that if a defect, as for instance, an incipient crack develops in such a mechanical part, its total electric resistance will increase. A change in resistance will be an indication of the extent to which the fracture has developed.

The method disclosed in the said patent, although in no wise limited to use with any particular mechanism, was developed by me primarily for testing parts of the running and driving gear of railroad locomotives for the detection of dangerous conditions, without dismantling the locomotive, or taking it out of service for any sustained period of time. It is especially applicable for the testing of crank pins and axles of locomotives. The crank pins for example, pass through the web of the driving wheel and project laterally beyond the plane of the wheel. The drivers, connecting rods, valve gears, etc., are attached to these crank pins. They are likely to fracture in use at a point approximately one inch in from the outer surface of the wheel. There is no method of visual inspection by means of which any crack or incipient fracture in a crank pin may be detected. The method of testing referred to in said patent, and to which the present invention relates, contemplates recording the total electrical resistance of the crank pin at the time it is initially put into service. As the locomotive is periodically serviced, as for example about every two months, the resistance is again measured and any noticeable increase indicates the development of a fracture.

My said patent above referred to is based on the use of a Kelvin double-bridge circuit for measuring the resistance of the pieces being tested, because by such circuit, the electric contact resistance between the test apparatus and the part being tested is minimized. For example, an electrical connection being made to the part being tested may introduce a greater or lesser amount of resistance into the circuit each time it is made. One time there may be a clean, tight contact, and another time a less favorable contact. The method of testing to which this invention relates must effectively eliminate or minimize such variation of contact resistance, and hence the employment of the Kelvin double-bridge type of circuit.

The driving wheels of the locomotive are spaced only a short distance out from a massive side frame forming the chassis of the locomotive. The crank pin is spaced a relatively short distance out from the axle. The method of testing to which my said patent relates, requires that the length of the crank pin be temporarily connected in series in the test circuit, which means that connections have to be made with the crank pin at its opposite ends, including the inner face of the crank pin end substantially flush with the inner side face of the driving wheel. The inner end face of the crank pin is difficultly accessible, and the connection must be made in the very close quarters between the side frame of the locomotive and the inner face of the locomotive wheel. Two circuit connections are established at the rear end of the pin, one being the so-called "potential connection" and the other being the so-called "current connection." The potential drop due to contact resistance relative the potential drop due to any defect in the crank pin or other part, are important factors to determine. Technicians running the tests have difficulty in making the connections at the rear end of the crank pin because of the inaccessible location of the end of the part being tested.

Ordinarily the crank pin at its inner end, where it is designed to be used in a system of testing as herein contemplated, is provided with a tapped hole extending into the crank pin. In making the test, the surface around the tapped hole is cleaned off as well as can be done to minimize contact resistance and consequent potential drop, and one contact is made against the end face F of the pin on this annular surface, and another contact is provided by a stud that screws into the tapped hole in the inner end face of the crank pin. At the outer readily accessible end face of the crank pin under test, a similar screw stud and annular contact area is provided for the test circuit so as to include the length of the crank pin.

All of the foregoing is by way of introduction, and the present invention pertains specifically to an implement by means of which the necessary connections with minimum contact resistance can be much more quickly and conveniently and positively made with the inner end face of the crank pin. Essentially the invention contemplates an implement having a handle and a head which is pivotally connected to the handle. The head carries a stud to be screwed into the tapped opening in the crank pin and an annular contacting surface to bear against the end of the crank pin is provided, and the handle carries a knob by means of which the stud can be rotated to screw it into the tapped hole in the crank pin. By reason of the pivotal connection between the handle and the head, the stud can be readily brought into alignment with the tapped hole, and by reason of the handle providing an extension for turning the stud, the screwing in of the stud can be effected very conveniently by a technician lying on the ground under the locomotive or standing in a pit beneath the locomotive or, when the locomotive is so placed as to bring crank pin in forward position below center, by standing slightly ahead of driving wheel near the locomotive frame.

The invention may be more fully understood by reference to the accompanying drawings, in which:

Fig. 1 is a more or less schematic view showing the relation between the locomotive driving wheel, the side frame, and the crank pin, showing the embodiment of the present invention attached to the rear end of the crank pin;

Fig. 2 is an elevation of the embodiment, this view being on a larger scale than Fig. 1;

Figure 3:
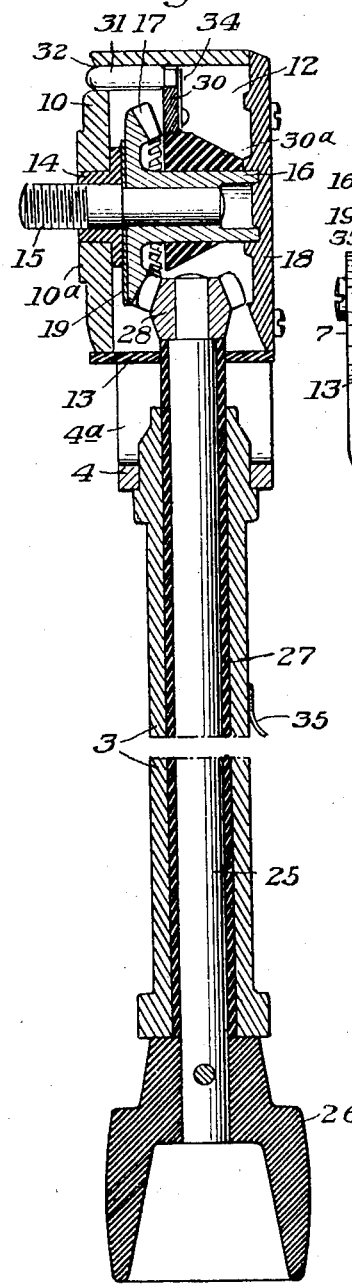
Fig. 3 is a longitudinal section through the instrument shown in Fig. 2.

In the drawings, and referring first to Fig. 1, A designates a locomotive driver, B the axle, C the wedge block and bearing assembly in the side frame D. The crank pin to be tested is designated E. The rear end face F of the crank pin is provided with an annular area e, and concentric with this is a tapped hole e'.

It will be seen from an inspection of Fig. 1 that the space between the crank pin and the locomotive side frame and wedge block assembly, even with the crank pin in its lowermost position, is quite inaccessible and cramped for making connections to the rear end face F of the crank pin, the space actually being much less accessible than Fig. 1 would indicate. When the crank pin is not under test, threaded studs 15a may be provided for the tapped holes e' in the opposite ends of the crank pin.

According to the present invention, there is provided a tool designated generally as 2 through which the necessary connections are made with the crank pin.

Figure 5:
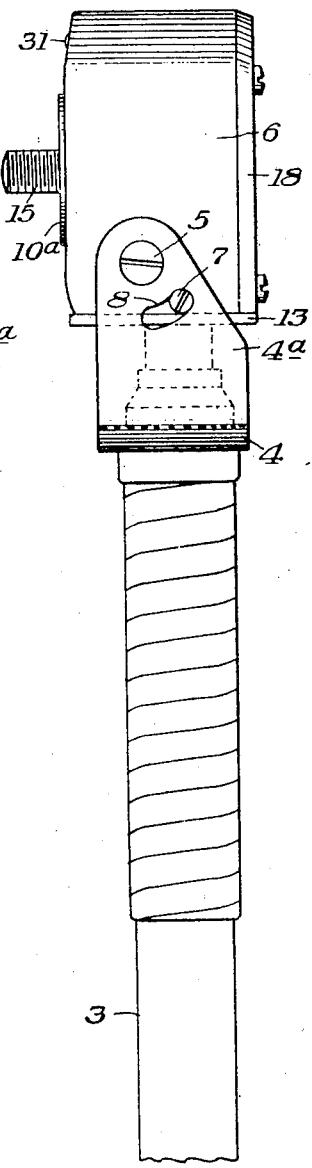
Fig. 5 is a side elevation of the implement, the view being at an elevation 90° from Figs. 2 and 4.

The tool 2 comprises a tubular handle 3 carrying a yoke 4 at its inner end. Pivoted in the two arms of the yoke 4 by means of trunnions 5 is a head member designated generally as 6. The pivotal movement of the member 6 on the trunnions is limited by screw studs 7 on the body of the head, which are engaged in arcuate slots 8 on the arms 4a of the yoke. Torsion springs 9 carried by the arms of the yoke and bearing against the insulated end wall 13 of the head 6 serve to normally hold the head in the position shown in Fig. 5, in which it is generally perpendicular to the longitudinal axis of the stem. In other words, while the head is free to tilt to a slight extent as determined by the arcuate slots 8, movement is against the action of the torsion springs and the head may not flop loosely on its trunnions.

The head is preferably in the form of a cast metal body having a solid face 10 and side walls 11 enclosing a chamber designated generally as 12. At 13 there is a transverse end wall which is made separately from the body for purposes of assembling the mechanism hereinafter described, the end wall 13 preferably being of insulating material.

The exterior of the face 10 of the body is provided with a slight circular projection or abutment 10a. In the face 10 is an opening into which is fitted a bushing 14, the bushing being of insulating material. Passing through the bushing and projecting beyond the end face of the head is a threaded stud 15. The inner end of this stud is non-rotatably fitted into a sleeve member 16 on a pinion 17 inside the chamber 12. A removable plate 18 formed of insulating material provides a bearing for the end of the sleeve 16.

Figure 4:
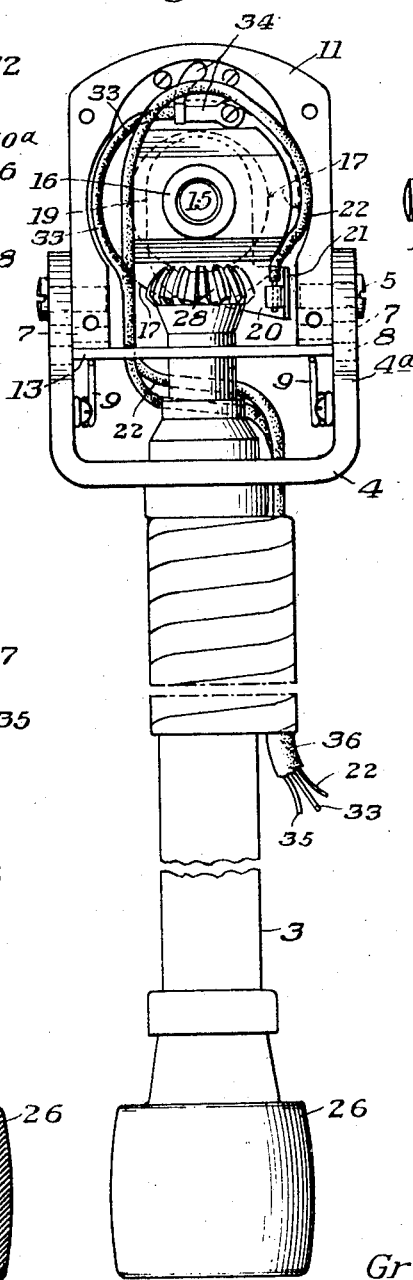
Fig. 4 is a view similar to Fig. 2, but on a larger scale, and showing the covering plate on the head removed.

Between the insulating bushing 14 and the under face of the gear 17 is a thin metal contact disc or plate 19 which is of the shape shown in dotted lines in Fig. 4, and which has an upturned portion 20 provided with a clip 21 (see Fig. 4), to which an electric wire 22 is connected. A conducting path from a wire 22 is provided through the thin metal plate 19 to the gear 17, and from the gear 17 into the stud 15.

Inside the stem or handle 3 of the tool is an axially extending shaft 25 having a knob 26 at its outer end, this knob being of insulating material so as to be electrically non-conductive. This shaft 25 is electrically insulated from the stem 3, there being shown an insulating sleeve 27 around the shaft. On the inner end of the shaft 25 is a pinion 28, which pinion is also in the chamber 12 in the head, and which is a modification of a conventional bevel gear in that the radial edges of the teeth are convex, and the center of curvature coincides approximately with the axis of the trunnions 5 in which the head pivots in the yoke and with the longitudinal axis of the shaft 25. By reason of this arrangement, the head with its gear 17 can pivot while remaining in mesh with the gear 28, and without any binding of the two gears. They mesh freely in any angular position to which the head can move within the limits determined by arcuate slots 8.

A fiber plate 30 may be provided in the chamber 12, and 30a designates a body of insulation fitted into the chamber about the sleeve 16. The fiber disc 30 may support a small electric light bulb 31 of the type used for example in surgical instruments, and other exploring devices, the tip of which shows through an opening 32 in the plate 10. A wire 33 and a sheet metal stamping 34 serve to make contact with one terminal of the bulb, the other terminal being grounded against the casing. A third electric wire, comparable to a current-carrying or line wire 35, may be soldered to the stem or handle 3 of the instrument so as to connect with the metal head or casing. The wires 22, 33, and 35 all are taped together near the inner end of the handle and merge into a cable 36.

In use the technician making the test first cleans the inner end of the drive pin as best he can to effect a low resistance contact connection. Then he reaches the implement up into the space between the wheel and the frame, the long handle enabling him to easily maneuver the head of the implement into the space against the inner end face F of the pin E. He catches the end of the threaded stud 15 first in the tapped hole e' and by a sense of feel, manipulates the end of the stud 15 into line with said tapped opening e'. He can manipulate the tool because of the pivoted connection between the handle and the head so as to properly line up the stud 15 with the tapped opening e' in the rear end of the driving pin. Then by turning the knob 26 he can screw the threaded stud 15 into the tapped opening e' until it is tight. This draws the projecting annular contacting portion 10a on the face of the housing into firm contact with the annular surface e around the tapped hole e' in the end of the drive pin. One path of electrical connection is thus provided through the threaded stud 15, the contact plate 19 and the wire 22, while a second path of current is provided through the area of the annular surface e around the hole e' from the end of the crank pin, to the contacting area of the annular surface of the raised part 10a which, by the screwing action referred to, is pressed tightly against the annular surface e' at the inner end of the drive pin E. This path of current of course is completed from the head into the handle to wire 35.

The purpose of the two connections is explained in my said Patent No. 2,326,352, wherein they are necessary to complete the double bridge circuit which minimizes the effect of variations in surface contact resistance each time connections are made for the test. After the test has been completed, the operator can of course quickly unscrew the stud 15 by turning the knob 26 in the reverse direction.

By the use of the present tool which is both rugged and simple, a series of tests may be quickly run on the drive pins of all of the locomotive drive wheels and the extreme difficulty of making the connections in this location is eliminated.

While I have described the invention as being particularly applicable to the testing of locomotive drive pins, the implement may advantageously be used in other locations and for testing other parts, it finding its chief utility, however, in locations in which reaching is required to make the connection, and where the place at which the connection is to be made is relatively inaccessible to the hands of the operator. The small electric light, while not essential, is of considerable convenience in enabling the operator to quickly locate the implement and maneuver it into place.

I have shown and described one particular embodiment of my invention, but it will be understood that various changes and modifications may be made within the contemplation of my invention and under the scope of the following claims.

I claim:

1. A connector of the class described comprising a head element, an elongated handle element pivotally suspended from the head element, a rotatable threaded stud on the head element electrically insulated therefrom, insulated means on the handle element for rotating the stud, and means for making electrical connections with the stud.

2. A connector of the class described comprising a head element, an elongated handle element on which the head element is carried, a rotatable threaded stud on the head element electrically insulated therefrom so as to serve as an electrical conductor, means on the handle element for rotating the stud, means for making electrical connections with the stud, the head element and the handle element being pivotally connected, and a spring yieldably connecting said head element to said handle element.

3. A connector of the class described comprising a head element, an elongated handle element on which the head element is carried, a rotatable threaded stud on the head element electrically insulated therefrom, a peripherally insulated shaft extending longitudinally of the handle element for rotating the stud, and means for making electrical connections with the stud, the head element being supported on the handle element for pivotal movement on an axis transverse to the axis of the handle element.

4. A connector of the class described comprising a head element, an elongated handle element on which the head element is carried, a rotatable threaded stud on the head element electrically insulated therefrom so as to serve as an electric conductor, insulated means on the handle element for rotating the stud, means for making electrical connections with the stud, the head element being supported on the handle element for pivotal movement in a plane transverse to the axis of the handle element, and means for limiting such pivotal movement of the head, and spring means for yieldably resisting the pivotal movement of the head.

5. A connector of the class described comprising a head element, an elongated handle element, a connector stud on the head element, means extending longitudinally through the handle element for rotating said stud, the head and handle element being pivotally connected for relative tilting movement in a plane transverse to the axis of the handle element, the stud being electrically insulated from the head, the said means being electrically insulated from the handle, and a second electric contact surface on the head element.

6. A connector of the class described comprising an electrically conductive head element, an elongated handle element, a threaded connector stud on the head element, means on the handle element for rotating said stud, the head and handle element being pivotally connected for relative tilting movement in a plane transverse to the axis of the handle element, the stud being electrically insulated from the head, the said operating means on the handle being electrically insulated from the handle, and a second electric contact surface on the head element, the said second electric contact surface being concentrically formed about the stud and comprising an integral portion of the head, the stud projecting beyond said contact surface, and means for making electric connection with the head independently of the stud.

7. An electrical connector for use in inaccessible places for making temporary connection to a part being tested, comprising a body having a threaded stud rotatably connected therein, insulated therefrom, an elongated handle member, at one end of which the said body is tiltably mounted, an insulated shaft extending through said handle member, means at the opposite end of the handle member operatively connected with the shaft and stud and electrically insulated from the body and handle for rotating the stud, and spring means operatively interposed between the body and the handle for yieldably resisting relative tilting movement between the handle and the body.

8. A connector for use in inaccessible places comprising a metal body adapted to form one contact element, a threaded stud projecting beyond and rotatably carried in the body and insulated therefrom and constituting another contact member, an elongated handle at one end of which the body is pivotally supported for movement on an axis transverse to the longitudinal axis of the handle, and operating means extending through the handle into the body and insulated from the body in the handle for rotating the stud.

9. A connector for use in inaccessible places comprising a metal body adapted to form one contact element, a threaded stud projecting beyond and rotatably carried in the body and insulated therefrom and constituting another contact member, an elongated handle at one end of which the body is pivotally supported for movement on an axis transverse to the longitudinal axis of the handle, and operating means extending through the handle into the body and insulated from the body in the handle for rotating the stud, said last named means comprising a shaft extending longitudinally of the handle with a pinion at its inner end, the stud having a bevel gear secured thereto meshing with said pinion.

10. A connector for use in inaccessible places comprising a metal body adapted to form one contact element, a threaded stud projecting beyond and rotatably carried in the body and insulated therefrom and constituting another contact member, an elongated handle at one end of which the body is pivotally supported for movement on an axis transverse to the longitudinal axis of the handle, and operating means extending through the handle into the body and insulated from the body in the handle for rotating the stud, said last named means comprising a shaft extending longitudinally of the handle with a pinion at its inner end, the stud having a bevel gear secured thereto meshing with said pinion, the teeth of the pinion being convex with the radius of curvature thereof coinciding with the longitudinal axis of the shaft and the axis about which the body and handle pivot relative to each other.

11. For use as a testing device of the class described, a connector comprising an elongated handle having a yoke at one end thereof, a metal body pivotally supported in the yoke for tilting movement about an axis transverse to the longitudinal axis of the handle, said body constituting one electric contacting element, a threaded stud rotatably mounted in the body and projecting therefrom constituting another contact element, the said stud being insulated from the body, means at the free end of the handle and extending through the handle into the body for rotating the stud, said last-named means being electrically insulated from the handle and body, means for making electric contact with the stud, and means for making electric contact with the body.

12. For use as a testing device of the class described, a connector comprising an elongated handle having a yoke at one end thereof, a metal body pivotally supported in the yoke for tilting movement about an axis transverse to the longitudinal axis of the handle, said body constituting one electric contacting element, a threaded stud rotatably mounted in the body and projecting therefrom constituting another contact element, the said stud being insulated from the body, means at the free end of the handle and extending through the handle into the body for rotating the stud, said last-named means being electrically insulated from the handle and body, means for making electric contact with the stud, and means for making electric contact with the body, the said body having a cavity therein in the face thereof from which the said stud projects, and an electric light in said cavity and means for conducting current to the electric light.

GROVER R. GREENSLADE.

REFERENCES CITED

The following references are of record in the file of this patent:

UNITED STATES PATENTS

| Number | Name | Date |
| --- | --- | --- |
| 1,223,791 | Jackson | Apr. 24, 1917 |
| 1,594,925 | Chandler | Aug. 3, 1926 |
| 1,808,518 | Board | June 2, 1931 |
| 1,840,150 | Bodendieck | Jan. 5, 1932 |
| 1,853,599 | Birkenmaier | Apr. 12, 1932 |

FOREIGN PATENTS

| Number | Country | Date |
| --- | --- | --- |
| 610,842 | Germany | Mar. 16, 1935 |